United States Patent
Poe et al.

(10) Patent No.: US 6,791,811 B2
(45) Date of Patent: Sep. 14, 2004

(54) CURRENT SENSE CIRCUIT

(75) Inventors: G. Bruce Poe, Hamilton, MI (US); Robert R. Turnbull, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 10/681,713

(22) Filed: Oct. 8, 2003

(65) Prior Publication Data

US 2004/0070907 A1 Apr. 15, 2004

Related U.S. Application Data

(63) Continuation of application No. 10/008,291, filed on Nov. 8, 2001, now Pat. No. 6,646,847.

(51) Int. Cl.⁷ ................................................ H02H 3/08
(52) U.S. Cl. ..................................................... 361/93.1
(58) Field of Search .......................... 361/93.1, 18, 78, 361/79, 91.1, 91.2; 323/276, 279, 280, 284; 327/535, 540; 315/194, 199

(56) References Cited

U.S. PATENT DOCUMENTS 6,646,847 B2 * 11/2003 Poe et al. .................. 361/93.1

* cited by examiner

*Primary Examiner*—Pia Tibbits
(74) *Attorney, Agent, or Firm*—Price, Heneveld, Cooper, DeWitt & Litton, LLP; James E. Shultz, Jr.

(57) ABSTRACT

A current sense circuit includes a current sense device and a voltage sense device. The current sense device is positioned to sense a drive current provided to a load by a drive circuit. The voltage sense device is coupled across the current sense device and receives a threshold signal at a first input and provides an output signal on an output whose value is dependent upon whether a sense signal at a second input is above or below the threshold signal. A level of the threshold signal changes in response to a voltage level of a power supply that supplies the drive current to the drive circuit.

26 Claims, 5 Drawing Sheets

CURRENT SENSE CIRCUIT

This application is a continuation of U.S. patent application Ser. No. 10/008,291, entitled "CURRENT SENSE CIRCUIT" filed on Nov. 8, 2001 now U.S. Pat. No. 6,646,847, by G. Bruce Poe et al. Priority under 35 U.S.C. §120 is hereby claimed on the above application and the entire disclosure is incorporated herein by reference.

BACKGROUND OF THE INVENTION

The present invention is generally directed to a current sense circuit and, more specifically, to a current sense circuit for use with an electro-optic element, such as an electrochromic element.

In various electronic circuits, it may be necessary or advantageous to monitor a current delivered by a drive circuit to a load so as to protect the load from over-current conditions. When a drive circuit receives its operating power from a power source whose output varies, e.g., an unregulated power supply, a drive current supplied by the drive circuit to a load will vary depending upon the voltage level of the power source. In situations where a series resistor is placed between a drive circuit and a load, to monitor the drive current supplied to the load, a monitoring circuit that monitors the voltage across the series resistor (to determine the current delivered to the load) may be unable to detect if the load is shorted when the output voltage level of the power source is at its lower extreme. This is due to the fact that circuits that have been used to monitor the voltage across the series resistor have had a fixed threshold, which has been set above a desired operating current. However, if the fixed threshold is set to a lower level, such as the current level that would be delivered to a load at the lower extreme output of a power source, false over-current indications may occur during normal operation.

As an example, in electrochromic (EC) vehicular rearview mirror assemblies, a drive circuit is provided, which varies the voltage across an EC element to vary the reflectivity of the mirror such that unwanted glare can be avoided or reduced. However, it is not uncommon for the power source that supplies the drive current to the drive circuit to vary from, for example, between nine and sixteen volts. As previously mentioned, when a series resistor is utilized for monitoring the current delivered to the load by the drive circuit, setting a fixed threshold to a nominal voltage, e.g., twelve and one-half volts, can prevent the monitoring circuit from detecting short circuits at the load at the lower voltage extreme when the fixed threshold is set above the value that can be achieved at the lower voltage.

Thus, what is needed is a current sense circuit with a variable threshold that is capable of tracking variations in a power source output level.

SUMMARY OF THE INVENTION

An embodiment of the present invention is directed to a current sense circuit that includes a current sense device and a voltage sense device. The current sense device is positioned to sense a drive current provided to a load by a drive circuit. The voltage sense device is coupled across the current sense device and receives a variable threshold signal at a first input and provides an output signal on an output whose value is dependent upon whether a sense signal at a second input is above or below the variable threshold signal whose level changes in response to a voltage level of a power supply that supplies the drive current to the drive circuit. In one embodiment, the load is an electrochromic element. In another embodiment, the current sense device is a resistor. In still another embodiment, the voltage sense device is a differential amplifier. In another embodiment, the output of the voltage sense device is coupled to an input of a control unit that controls a level of the drive current provided by the drive circuit in response to the output signal.

These and other features, advantages and objects of the present invention will be further understood and appreciated by those skilled in the art by reference to the following specification, claims and appended drawings.

DETAILED DESCRIPTION OF THE PREFERRED EMBODIMENTS

According to an embodiment of the present invention, a current sense circuit is provided that allows a short circuit at a load (e.g., an electrochromic element) to be detected even when an output of a power supply, that supplies power to a drive circuit, varies (e.g., from nine to sixteen volts). According to one embodiment, when a shorted load is detected, the current sense circuit provides an output to a control circuit that in response thereto provides a signal to the drive circuit, which causes, for example, the drive circuit to discontinue providing current to the load.

As will be apparent to those skilled in the art, certain aspects of the present invention may be implemented in vehicle accessories other than a mirror assembly, such as an overhead console, a visor, an A-pillar trim panel, an instrument panel, etc. With respect to those implementations, the discussion below relating to mirror assemblies is provided for purposes of example without otherwise limiting the scope of the invention to such mirror assemblies. The present invention may also be used for non-automotive applications such as controlling an electrochromic filter or architectural window, or any other electro-optic or electrical device.

Figure 1:
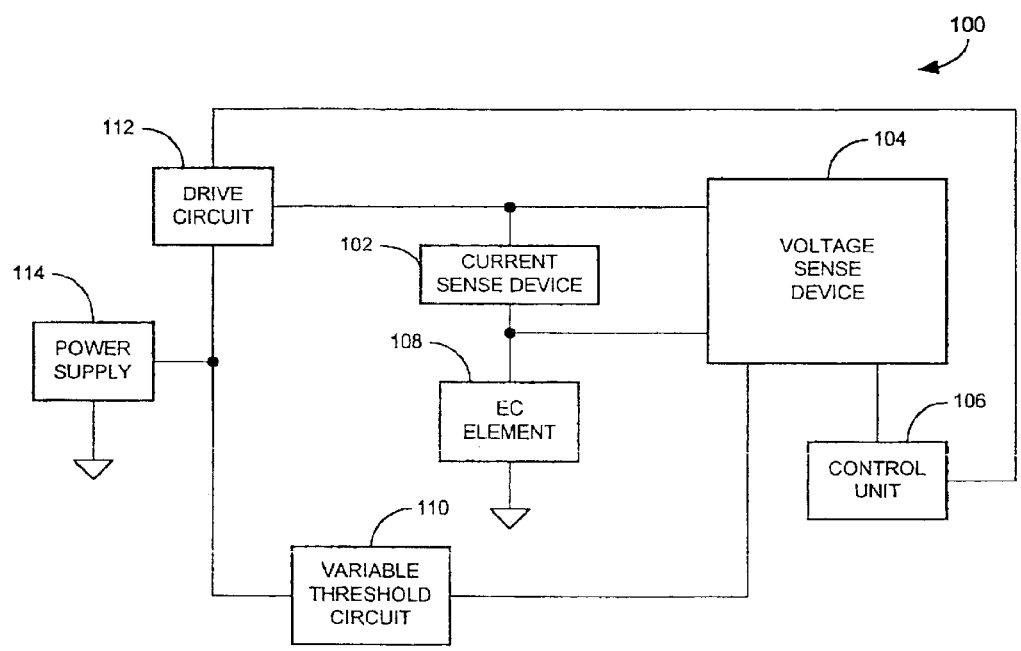
FIG. 1 is an electrical block diagram of a current sense circuit for monitoring a drive current supplied to a load by a drive circuit.

Turning to FIG. 1, an exemplary rearview mirror control system 100 includes, a control unit 106 that is coupled to a voltage sense device 104 and a drive circuit 112. The drive circuit 112 is coupled to and receives power from a power supply 114, which may be an unregulated power supply. The drive circuit 112 is also coupled to a current sense device 102, which is coupled to a load, e.g., an electrochromic (EC) element, 108. The power supply 114 is also coupled to a variable threshold circuit 110, which is coupled to the voltage sense device 104. The voltage sense device 104 is also coupled across the current sense device 102. It should be appreciated that the voltage sense device 104 may be coupled directly across the current sense device 102 or may be coupled across the current sense device 102 and additional components. In this case, the voltage added by the additional components may be readily removed when the impedance of the additional components is known.

The variable threshold circuit 110 provides a variable threshold signal, to the voltage sense device 104, that varies as a function of the output voltage level of the power supply 114. That is, should the voltage level supplied by the power supply 114 decrease, the variable threshold circuit 110 provides a lower threshold signal to the voltage sense device 104. This allows the voltage sense device 104 to track variations in the power supply 114 such that short circuit conditions in the EC element 108 can be detected, when the output of the power supply 114 varies across a range of values. The control unit 106 may be a microcontroller, a microprocessor coupled to a memory subsystem, a field programmable gate array (FPGA), etc. In one embodiment, the current sense device 102 is a resistor that is placed in series between the drive circuit 112 and the EC element 108. In an embodiment, the voltage sense device 104 is an operational amplifier that is differentially coupled across the current sense device 102.

Figure 2:
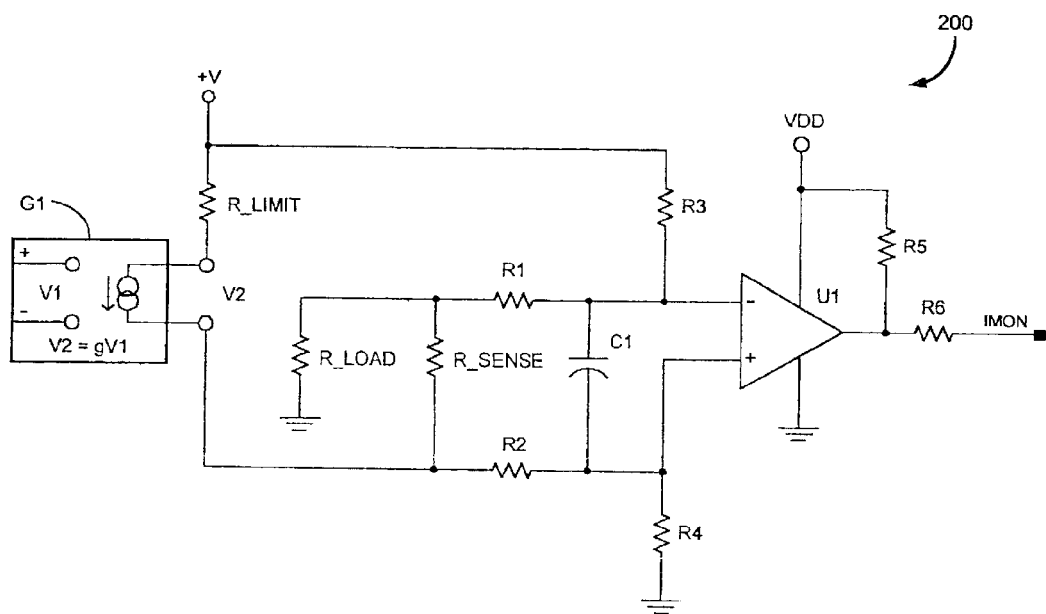
FIG. 2 is an electrical schematic of an exemplary current sense circuit, according to one embodiment of the present invention.

FIG. 2 depicts an electrical schematic of an exemplary current sense circuit 200, according to one embodiment of the present invention. As shown in FIG. 2, a first terminal of a drive circuit G1 is coupled to a power supply +V, through a current limiting resistor R_limit (e.g., 20 ohms). A second terminal of the drive circuit G1 is coupled to a resistive load R_load (e.g., 12 ohms), through a sense resistor R_sense (e.g., 0.33 ohms). A resistor R1 (e.g., 1 kohm) is coupled between a first side of the resistor R_sense and a negative input of operational amplifier U1. A resistor R2 (e.g., 1 kohm) is coupled between a second side of the resistor R_sense and a positive input of the operational amplifier U1. A first side of a resistor R3 (e.g., 66.5 kohms) is coupled to the negative input of the operational amplifier U1 and a second side of the resistor R3 is coupled to the power supply +V. A resistor R4 (e.g., 66.5 kohms) is coupled between the positive terminal of the operational amplifier U1 and a common ground. A resistor R5 (e.g., 47 kohms) is coupled between an output of the operational amplifier U1 and a power supply VDD. A resistor R6 (e.g., 1 kohm) is serially coupled between the output of the operational amplifier U1 and an external device, e.g., an input of a microcontroller (not shown in FIG. 2).

The resistors R1 and R3 form a voltage divider that sets a threshold Vth (which is approximately equal to $+V*(R1/(R1+R3))$). The slope of a short circuit load line is approximated by the following admittance: $Y=1/R\_limit$. The slope of the threshold current versus the input voltage is approximately $R1/(R\_sense*R3)$. The resistors R1, R2, R3 and R4 form a differential input to the operational amplifier U1, which senses a voltage developed across the resistor R_sense as load current passes through the resistor R_sense. The resistor R5 pulls the output of the operational amplifier U1 to VDD when the output of the operational amplifier is not low. In this manner, the resistor R5 ensures that a recognized logic level is provided to an input of an external device (e.g., a microcontroller). The value of the resistor R6 is selected to provide isolation between the output of the operational amplifier U1 and the input of the external device. A capacitor C1 (e.g., 270 pF) may be provided across the negative and positive inputs of the operational amplifier U1 to improve common mode rejection at high frequencies and increase immunity to external RF sources, which can initiate false over-current indications.

Figure 4:
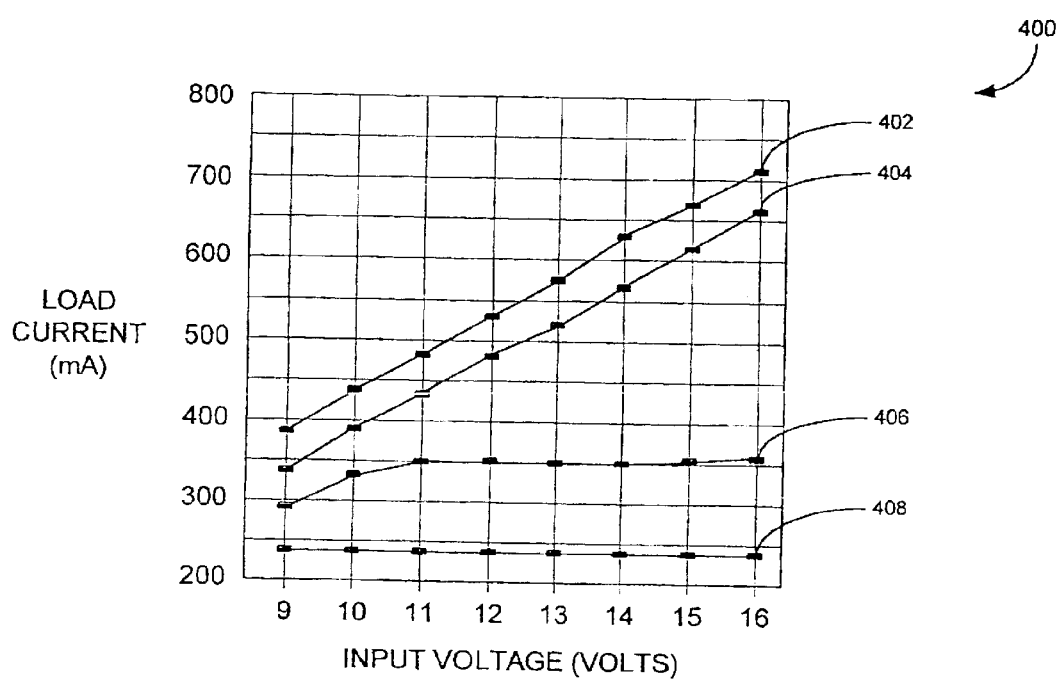
FIG. 4 is a graph depicting a load current as a function of an input voltage for the circuit of FIG. 2.

FIG. 4 depicts an exemplary graph of four curves that depict the relationship of a load current to an input voltage (i.e., a power supply voltage) for a number of conditions. A steady-state current curve 408 depicts the steady-state current when the load is not shorted, after a predetermined time period, e.g., fifteen seconds. An initial current curve 406 depicts an initial current when a load is not shorted at a predetermined time period of, for example, fifteen milliseconds. A steady-state current curve 402 depicts a steady-state current when the load R_load is shorted. A threshold curve 404 shows how the threshold Vth tracks the steady-state current curve 402 as the input voltage increases. That is, the curve 404 tracks the curve 402 and allows a short circuit condition to be detected as the input voltage provided by the power supply +V varies from nine to sixteen volts.

This allows the threshold Vth to be set above the steady-state current curve 406 while still allowing a shorted load to be detected. It should be appreciated from the graph of FIG. 4 that if a fixed threshold current of four hundred milliamperes is chosen, a short circuit condition could not be detected when the input voltage was below approximately ten volts. It should be appreciated that utilizing the current sense circuit 200 allows the drive circuit G1 to deliver a maximum current, demanded by a load, over a variable input voltage while at the same time still detecting when the load is shorted and responding in an appropriate fashion.

Figure 3:
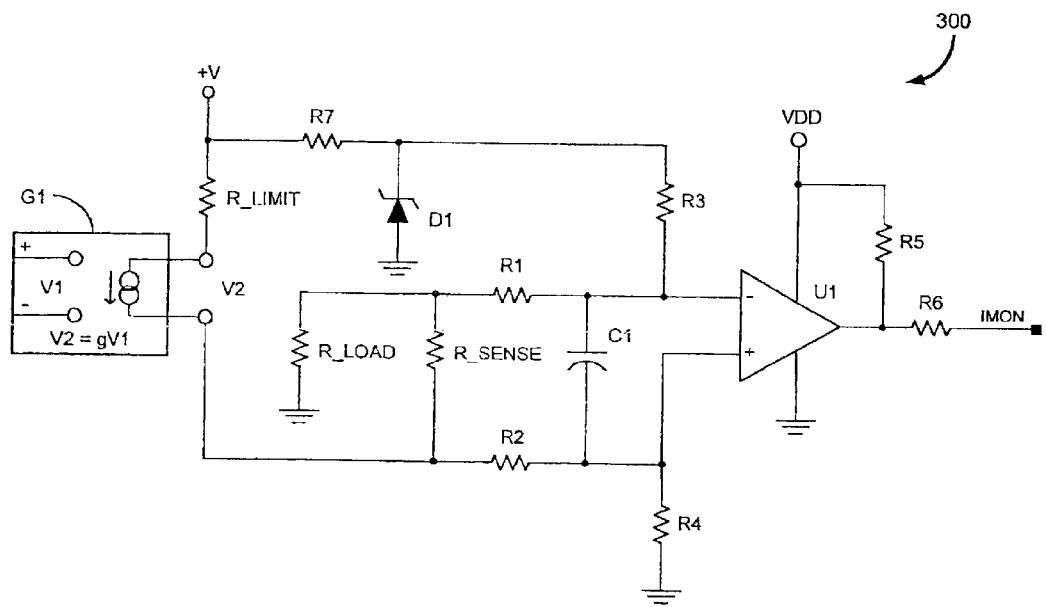
FIG. 3 is an exemplary electrical schematic of a current sense circuit, according to another embodiment of the present invention.

FIG. 3 shows an electrical schematic for a current sense circuit 300, according to another embodiment of the present invention. The current sense circuit 300 (of FIG. 3) is similar to the current sense circuit 200 (of FIG. 2), with the exception of an additional resistor R7 (e.g., 330 ohms) and a zener diode D1 (e.g., a twelve volt zener diode). The resistor R7 is coupled between the resistor R3 and the power supply +V. A cathode of the zener diode D1 is coupled to the second side of the resistor R3 and the anode of diode D1 is coupled to common ground. The zener diode D1 is used to limit the threshold Vth to a fixed value, below the value of the power supply +V, as the output level of the power supply +V varies. The resistor R7 serves to limit the zener current that can flow through the zener diode D1.

Figure 5:
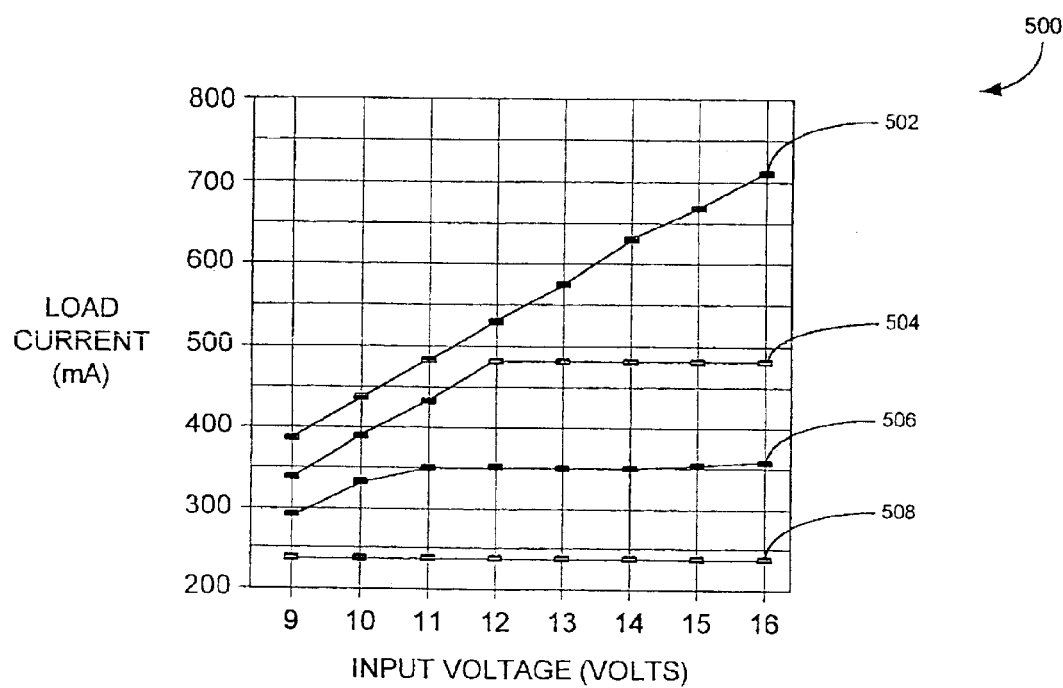
FIG. 5 is a graph depicting a load current as a function of an input voltage for the circuit of FIG. 3.

Turning to FIG. 5, an exemplary graph 500 depicts the relationship between the load current and the input voltage (i.e., a power supply voltage) for the current sense circuit 300 of FIG. 3. A steady-state current curve 508 shows the relationship between the load current and the input voltage when the load is not shorted after a predetermined time period of, for example, fifteen seconds. An initial current curve 506 shows the relationship between the load current and the input voltage when the load is not shorted at a particular point in time, for example, fifteen milliseconds after power is applied. A threshold curve 504 depicts the threshold Vth, which follows a steady-state current curve 502 until the zener diode D1 turns on at twelve volts. This provides a piecewise-linear continuous function that sets a maximum threshold Vth. It should be appreciated that by judicious selection of the resistors R1, R3 and R_sense, a current-to-voltage relationship can be developed that has essentially the same current-to-voltage characteristics as the drive circuit G1. It should also be appreciated that by properly selecting the values for the resistors R1, R3 and R_sense, other slopes can be achieved.

Accordingly, a current sense circuit has been described herein that provides a variable threshold that changes in response to a voltage level of a power supply, which provides drive current to a load. It should be appreciated that at least portions of the current sense circuits, as described herein, can generally be embodied in forms other than discrete devices, e.g., a control circuit, such as a programmed microcontroller, a programmed microprocessor, etc.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A current sense circuit, the circuit comprising:
   a current sense device positioned to sense a drive current provided by a drive circuit to a load; and
   a voltage sense device coupled across the current sense device, the voltage sense device receiving a threshold signal at a first input and providing an output signal on an output whose value is dependent on whether a sense signal representing the sensed drive current and applied to a second input is above or below the threshold signal, wherein a level of the threshold signal changes in response to a voltage level of a power supply that supplies the drive current to the drive circuit.

2. The circuit of claim 1, wherein the load is an electrochromic element.

3. The circuit of claim 1, wherein the current sense device is a resistor.

4. The circuit of claim 1, wherein the voltage sense device is a differential amplifier.

5. The circuit of claim 1, wherein the output of the voltage sense device is coupled to an input of a control unit, and wherein the control unit controls a level of the drive current provided by the drive circuit in response to the output signal.

6. The circuit of claim 1, wherein the threshold signal has substantially the same current-to-voltage characteristics as the drive circuit.

7. The circuit of claim 1, wherein the threshold signal is limited to provide a piecewise-linear continuous function.

8. The circuit of claim 1, wherein the threshold signal is fixed.

9. The circuit of claim 1, wherein the threshold signal is variable.

10. A current sense circuit, the circuit comprising:
    a sense resistor positioned to sense a drive current provided by a drive circuit to a load; and
    a differential amplifier having a positive input and a negative input coupled across the sense resistor, the differential amplifier receiving a threshold signal at the negative input and providing an output whose value is dependent on whether a sense signal representing the sensed drive current and applied to the positive input is above or below the threshold signal, wherein a level of the threshold signal changes in response to a voltage level of a power supply that supplies the drive current to the drive circuit.

11. The circuit of claim 10, wherein the load is an electrochromic element.

12. The circuit of claim 10, wherein the output of the voltage sense device is coupled to an input of a control unit, and wherein the control unit controls a level of the drive current provided by the drive circuit in response to the output signal.

13. The circuit of claim 10, wherein the threshold signal has substantially the same current-to-voltage characteristics as the drive circuit.

14. The circuit of claim 10, wherein the threshold signal is limited to provide a piecewise-linear continuous function.

15. The circuit of claim 10, wherein the threshold signal is fixed.

16. The circuit of claim 10, wherein the threshold signal is variable.

17. A mirror assembly, comprising:
    an electrochromic element;
    a drive circuit for providing a drive current to the electrochromic element;
    a current sense device positioned to sense the drive current provided by the drive circuit; and
    a voltage sense device coupled across the current sense device, the voltage sense device receiving a threshold signal at a first input and providing an output signal on an output whose value is dependent on whether a sense signal representing the sensed drive current and applied to a second input is above or below the threshold signal.

18. The assembly of claim 17, wherein a level of the threshold signal changes in response to a voltage level of a power supply that supplies the drive current to the drive circuit.

19. The assembly of claim 17, wherein the current sense device is a resistor.

20. The assembly of claim 17, wherein the voltage sense device is a differential amplifier.

21. The assembly of claim 17, wherein the output of the voltage sense device is coupled to an input of a control unit, and wherein the control unit controls a level of the drive current provided by the drive circuit in response to the output signal.

22. The assembly of claim 17, wherein the threshold signal has substantially the same current-to-voltage characteristics as the drive circuit.

23. The assembly of claim 17, wherein the threshold signal is limited to provide a piecewise-linear continuous function.

24. The assembly of claim 17, wherein the drive circuit varies a drive voltage applied to the electrochromic element, and wherein the threshold signal changes in response to a voltage level of a power supply that supplies the drive current to the drive circuit.

25. The circuit of claim 17, wherein the threshold signal is fixed.

26. The circuit of claim 17, wherein the threshold signal is variable.

* * * * *